April 25, 1939.  M. L. ECKMAN  2,155,412
WELDING APPARATUS
Filed Feb. 1, 1937   3 Sheets-Sheet 1

INVENTOR.
MERIL L. ECKMAN
BY
Bates, Golrick, & Teare
ATTORNEYS

April 25, 1939.  M. L. ECKMAN  2,155,412
WELDING APPARATUS
Filed Feb. 1, 1937  3 Sheets—Sheet 3

INVENTOR.
MERIL L. ECKMAN
BY Bates, Goldrick, & Teare
ATTORNEYS

Patented Apr. 25, 1939

2,155,412

UNITED STATES PATENT OFFICE 2,155,412

WELDING APPARATUS

Meril L. Eckman, Cleveland, Ohio, assignor to American Coach and Body Company, Cleveland, Ohio, a corporation of Ohio Application February 1, 1937, Serial No. 123,369

11 Claims. (Cl. 219—4)

This invention relates to a welding mechanism, and especially to a portable or semi-portable mechanism for electrically effecting spot welds.

An object of the present invention is to provide a comparatively small mechanism which may readily be moved from place to place to effect spot-welding of metal, and which will be provided with a simple, mechanically-operated means for bringing the welding electrodes into clamping contact with the object or objects to be welded.

Another object of the present invention is to provide a portable welding tool, with a power mechanism for moving the welding electrodes into clamping relation to the work, while at the same time materially reducing the weight and size of that part which is commonly referred to as the "gun".

A further object of my invention is to make a safety appliance which will prohibit the passage of current through the electrodes until the electrodes are pressed against the work with sufficient force to insure a proper weld. Experience has shown that if insufficient pressure is applied between the electrodes and work while the current is flowing, that either the electrodes or the work are burned and thereby damaged.

Other objects of the present invention will become more apparent from the following description, reference being had to the accompanying drawings, which illustrate a preferred embodiment of the invention. The essential and novel features of the invention will be summarized in the claims.

Figure 1:
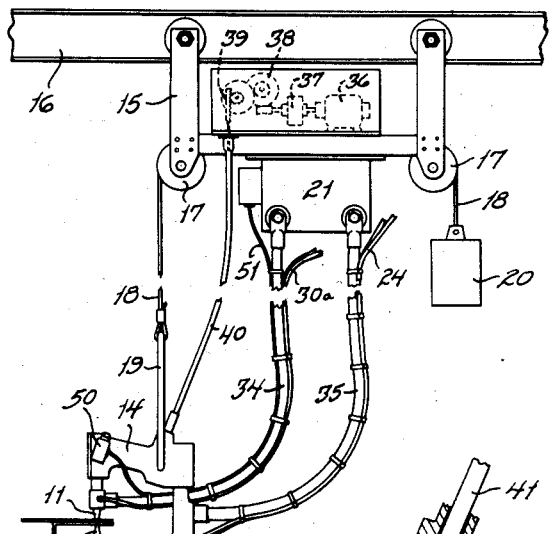
Figure 2:
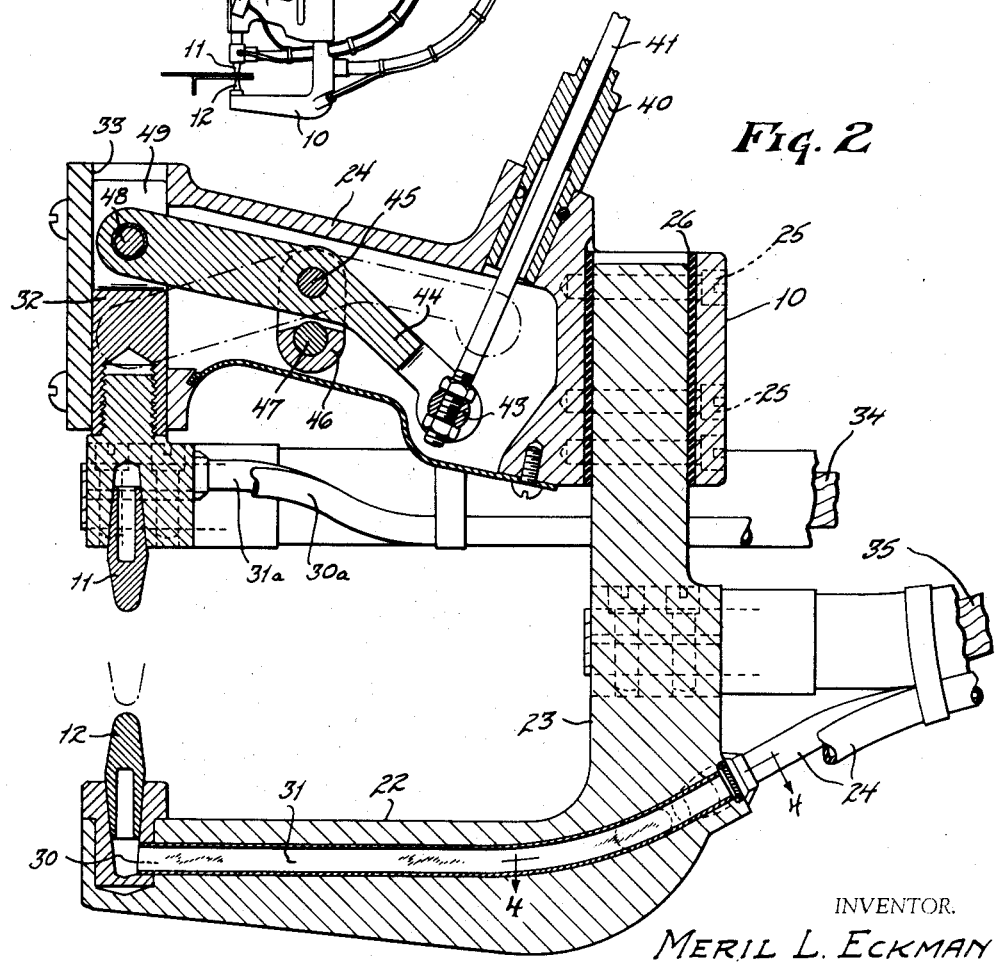
Figure 4:
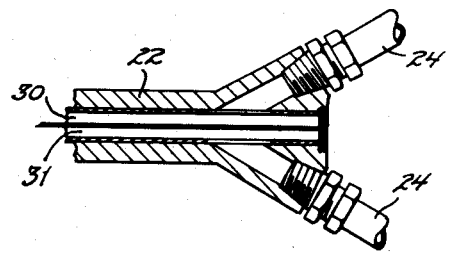
Figure 3:
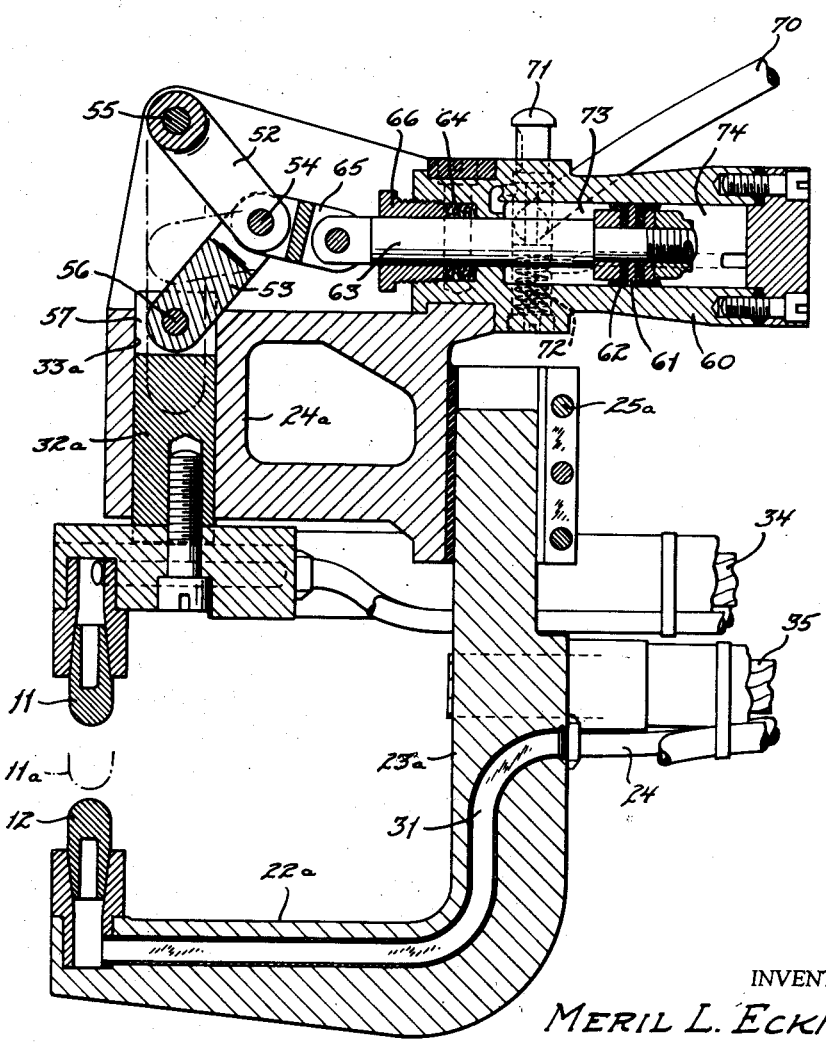
Figure 5:
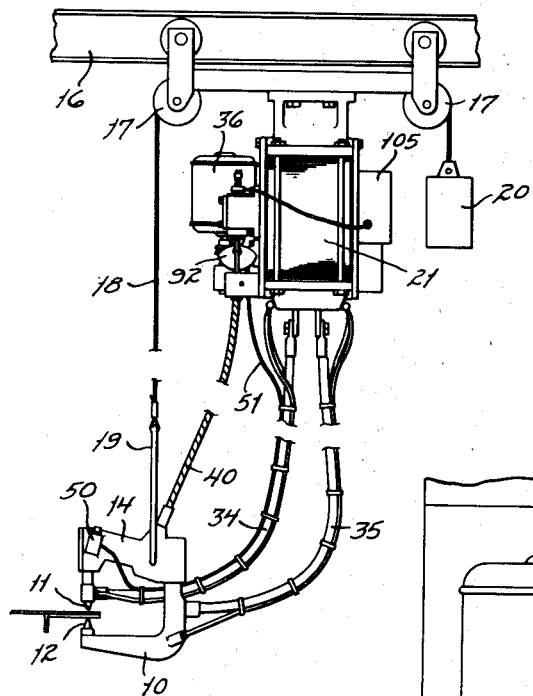
Figure 6:
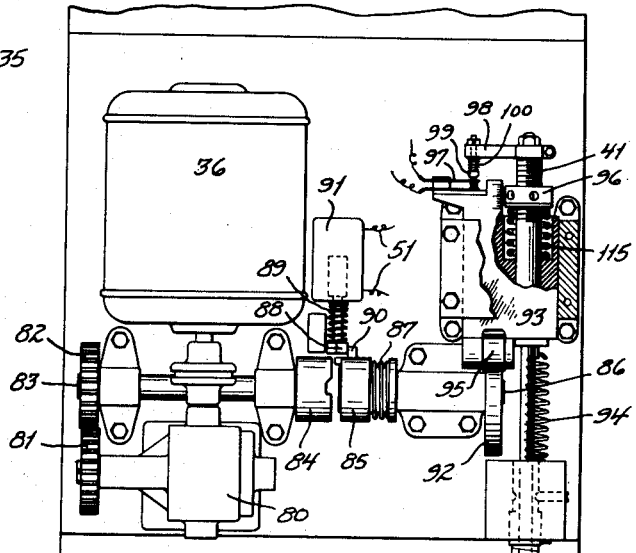
Figure 7:
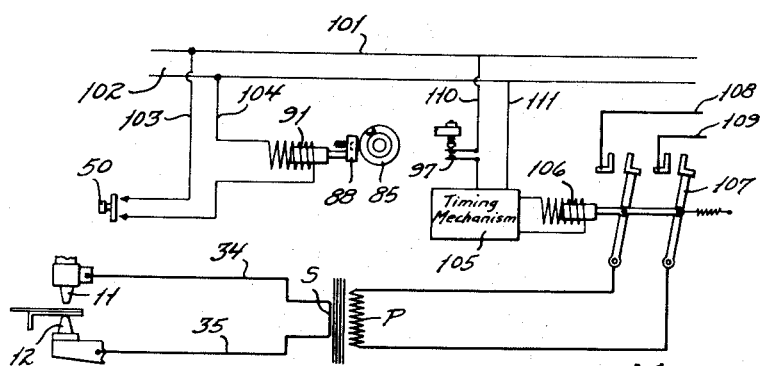

Referring now to the drawings, Fig. 1 is a side elevation of a welding tool together with the supporting and power-operating mechanism therefor; Fig. 2 is a substantially vertically located section through the tool and is taken in a plane parallel with the plane of Fig. 1, the scale of the section being substantially greater than the scale of Fig. 1; Fig. 3 is a section, similar to Fig. 2, illustrating a modified form of tool arranged to be either pneumatically or hydraulically operated; Fig. 4 is a sectional detail, as indicated by the line 4—4 on Fig. 2; Fig. 5 is a side elevation of a welding device which includes a safety feature that is made in accordance with my invention; Fig. 6 is an enlarged side elevation partly in section showing the safety mechanism on a scale larger than that illustrated in Fig. 5, and Fig. 7 is a wiring diagram.

Referring now to the drawings, it will be seen that the welding tool with which my invention is especially concerned comprises a C-shaped frame member, provided with oppositely facing welding electrodes 11 and 12, which are carried by the open ends of the C respectively. The upper arm of the C-shaped frame, is arranged and adapted to form a hand grip 14 and encloses certain operating mechanism to bring the upper electrode 11 into gripping contact with work resting on the lower electrode 12.

The welding tool is comparatively small and is adapted to be supported from an overhanging structure, such as, for instance, a trolley 15, carried by a trolley rail 16. The trolley is provided with pulleys 17, which support a cable 18, one end of which is secured to a yoke 19 of the tool, while the other end is secured to a weight 20, arranged to counter-balance the weight of the tool. Thus, the welding tool may be readily raised and lowered or moved from place to place, as desired by the operator.

Supported on the trolley 15 is a source of suitable welding current, such as, for instance, a transformer or motor generator unit carried within a housing 21. The trolley also supports a motor 36, which, as will hereinafter be more fully described, is arranged to actuate the electrodes to cause the work to be gripped therebetween.

The frame 10, as heretofore mentioned, is in the form of a C and is, as shown, in Fig. 2, made in two parts, the lower horizontal member 22 of which has a vertical leg 23 formed integral therewith. This vertical leg 23 is adjustably mounted in the upper horizontal member 24, being secured in an adjusted position relative thereto by bolts 25. The lower frame member 22 is electrically insulated from the upper member 24 by insulation 26, interposed between the two members as shown in Fig. 2.

The electrode 12 may be removably secured to the lower member. This electrode is hollow and is connected by suitable passageways or conduits 30 and 31, which run through the frame member 22, with conduits 24, and through which a flow of cooling fluid is maintained. The construction of the conduits 30 and 31 form the subject matter of my copending application for Letters Patent and hence are not described in detail herein. The upper electrode 11 may be mounted on a slide 32, which is carried in a vertical guideway 33, formed in the upper frame member 24. This electrode is likewise hollow and is supplied with a cooling fluid through suitable flexible conduits 30a and 31a (Fig. 2).

Electrical energy is supplied to the electrodes 11 and 12 by flexible cables 34 and 35, which extend downwardly from the transformer or generator unit 21. The cable 34 is electrically connected to the upper electrode carrier or slide 32, while the cable 35 is electrically connected to the lower metallic frame member 22—23, which supports the lower electrode 12. The slide 32 and frame 2 thus form a part of the electrical connectors to their respective electrodes.

The welding tool illustrated in Figs. 1 and 2 is especially adapted for mechanical operation. As there shown, an electric motor 36, which is preferably of the reversible type, is supported by the trolley 15 and is connected with suitable speed-reducing gearing 38, by a friction clutch 37. The gearing may operate a rack 39 reciprocally supported by the trolley 15.

Extending downwardly from the trolley 15, and interconnected between the trolley and the upper frame member 24 of the welding tool, is a flexible conduit 40, in which is mounted a flexible control wire 41 of the type generally used to transmit either a pushing or pulling movement. One end of the control wire 41 is secured to the rack 39, while the other end passes downwardly into the hollow upper frame member 24 of the welding unit and is there secured to a pin 43, which is carried by one end of a lever 44. The lever 44 is pivoted intermediate its ends, as at 45, to a link 46, which is pivotally mounted on a pin 47 carried by the frame member 24. The other end of the lever 44 is pivoted, as at 48, to the forked upper ends 49 of the electrode carrier or slide 32.

The motor 36 is preferably controlled by an electric switch mechanism, generally indicated at 50, as being secured to the upper frame member 24 in a position to be conveniently actuated by the operator when the upper frame member 24 is grasped in the hand, and connected with the motor 36 by a flexible conductor 51. If desired, this switch may also serve to control the passage of the welding current to the electrodes. The arrangement may be such that, when the switch mechanism 50 is actuated to apply electrical current to the motor 36, the flexible cable 41 will be raised until the electrode has gripped the work, whereupon the clutch 37, which may be of the friction disc type, permits the motor to continue to operate without damaging the parts. When it is desired to release the welding electrode from the work, the switch mechanism may be again actuated, causing the motor to be reversed, whereupon the flexible cable 41 is depressed, thus raising the electrode 11 from contact with the work.

In the construction just described, the transformer and electrode actuating motor are mounted on a support, such as the trolley 15, which may be remote from the welding tool, and are connected to the tool by flexible connections. Thus, the tool may be comparatively light in weight to facilitate the movement of it from place to place by the operator. The connection between the operating motor and the tool is entirely mechanical, thus avoiding the use of pneumatic conduits and the attendant danger of seepage of pressure due to inadvertent damage to such conduits. Moreover, the compact construction permits the tool to be used in locations that heretofore would not have sufficient clearance to admit it.

In Fig. 3 I have shown a modified form of welding mechanism in which the upper electrode 11 may be operated by air pressure. Such a construction, at times, may be found to be convenient in manufacturing establishments utilizing air pressure for the operation of various other tools and mechanisms. The welding mechanism illustrated in Fig. 3 comprises upper and lower frame members 22a and 24a, respectively, the lower frame member having a vertically extending post 23a, which is insulated from and adjustably secured to the upper frame member by bolts 25a. In this modified form of the invention the lower electrode is carried in the same manner as heretofore described in connection with the forms illustrated in Fig. 2. The upper electrode is carried by a slide 32a, which is mounted for vertical movement in a guideway 33a formed in the upper frame member 24a.

In the form of tool illustrated in Fig. 3, the upper electrode may be moved towards the lower electrode by a toggle mechanism which is operated by fluid under pressure. The toggle mechanism comprises a pair of links 52 and 53, which are pivotally interconnected by a pin 54. The link 52 is pivotally connected as at 55 with the upper frame member 24a, while the lower link is pivotally connected as at 56, with the forked upper end 57 of the electrode carrier 32a.

The fluid may be applied to a pneumatic cylinder which may be supported by the upper frame member in a horizontal position, with its piston substantially in line with the direction of travel of the toggle pivot 54. As shown, there is a cylinder 60, in which is slidably mounted a piston 61, which is provided with the usual piston rings or packing 62. The piston is carried by a supporting rod or plunger 63, which extends through the forward wall of the cylinder, as shown in Fig. 3, and is pivotally connected to the toggle pivot 54 by a link 65. Suitable packing 64 and a packing follower 66 prevent seepage of pressure from the cylinder.

Air may be supplied to the cylinder through a flexible conduit 70, which is connected with a valve 71 of the general type arranged to selectively admit pressure to either face of the piston. As illustrated, the valve comprises a plunger which is normally maintained in an uppermost position by a spring 72. With the valve in this position, the conduit 70 is connected with the left-hand portion 73 of the cylinder (Fig. 3), whereas when the plunger 71 is depressed, the conduit 70 is connected with the right-hand portion 74 of the cylinder. When in the latter position, the piston acts to force the toggle into a substantially straight-line position, bringing the upper electrode 11 into the dotted line position 11a indicated in Fig. 3.

Due to variations in the thickness of sheet metal upon which the welding apparatus is intended to operate, or due to wear or maladjustment of the mechanism which operates the electrode, there is a likelihood of the current being applied before the electrodes engage the work with an adequate degree of pressure to insure a proper weld. My invention therefore, includes a mechanism which will prevent the flow of current through the electrodes until the work is engaged by the electrodes with sufficient pressure to make a satisfactory weld. Broadly, the mechanism which I employ includes a pilot switch, which is under the control of the electrode actuator and which is connected in series with the relay that controls the current which flows in the primary circuit of the transformer.

The preferred mechanism for accomplishing the safety feature is illustrated in Figs. 5 and 6, wherein the motor 36 is shown as being mounted on the side of the transformer housing and as comprising a continuously rotating motor, which operates through a reduction gear assembly 80 and through the medium of gears 81 and 82 to rotate a shaft 83. The shaft 83 operates the driving member 84 of a clutch, the driven member 85 of which is mounted on a shaft 86 and is normally urged into engagement with the member 84 by a spring 87. The clutch members are arranged however to be held out of engagement with each other by means of a plunger 88, which is adapted under the influence of a spring 89 to project into the path of a lug 90 that projects from the member 85 and the plunger 88, in turn, is arranged to be retracted by a solenoid indicated in general at 91 which is under the control of the push button switch 50, the arrangement being such that whenever the circuit is closed at the push button switch, the plunger 88 is retracted until it clears the lug 90, whereupon the clutch member 85 engages the driver 84, and thereby effects rotation of the shaft 86.

To translate motion from the shaft 86 to the push rod 41 I mount a cam 92 rigidly on the shaft 86 and I utilize the cam for raising a carriage 93 against the tension of a spring 94. A roller 95 on the carriage is thus held in contact with the cam and the throw of the cam is designed to move the rod 41 sufficiently far to actuate the electrode.

At the start of the cam rotation and until the electrode engages the work, the carriage 93 and push rod 41 moves upwardly as a unit, but as soon as the electrode engages the work, and thereby restricts further movement of the push rod 41, the carriage 93 continues to move thereby compressing a spring 115 which is shown as surrounding the push rod 41, and as bearing against an adjusting nut 96 thereon, and also against the bottom wall of a pocket in the carriage 93. The relative motion between the carriage and push rod is utilized for actuating a mechanism, which in turn controls the timing mechanism that is used for operating the main switch in the primary circuit of the transformer. In the preferred form, the mechanism comprises a controller 97 on the carriage and an actuating arm 98 on the push rod. A plunger 99 is carried by the arm 98 and is adapted to engage on one of the contact carriers on the controller 97 whenever the carriage is moved sufficiently far with reference to the push rod to assure adequate contact between the electrodes and the work. The parts are so adapted with respect to each other that when the circuit through the controller 97 is closed, the cam 92 will not have reached the full limits of its throw. Accordingly, the throw on the plunger 99 allows the plunger to recede under the influence of the moving carriage until the cam reaches the limit of its throw.

The wiring diagram illustrated in Fig. 7 shows an arrangement whereby the manually controlled switch 50 operates the solenoid 91 and thereby governs the operation of the driven clutch member 85. Current for operating the solenoid 91 may be obtained from the service lines 101 and 102 through the conductors 103 and 104 respectively. A transformer timing mechanism indicated in general at 105 may be mounted on the side of the transformer housing and may be used for actuating a solenoid 106, which is arranged to actuate a switch 107 for closing a circuit through the primary coil P of the transformer. As higher voltage on the primary is ordinarily used than is used for operating the control or timing mechanism, the leads for the primary circuit source of supply are indicated at 108 and 109 respectively. The circuit timing mechanism includes conductors 110 and 111 respectively and also the controller 97. Current to the electrodes may be supplied by the conductors 34 and 35 which extend from the secondary S of the transformer.

The safety mechanism which I have devised assures the exertion of the proper degree of pressure between the electrodes and the work whenever the current is permitted to flow through the electrodes. Consequently, the electrodes are not liable to be damaged as would be the case if current were allowed to flow before the electrodes made adequate contact with the work.

From the foregoing specification, it will become apparent that I have provided a welding mechanism which is simple in construction, which may be manufactured at a minimum expense, and which is readily adaptable for various kinds of welding operations by semi-skilled workmen. Additionally, the operating mechanism eliminates wear and facilitates the operation and positioning of the electrode into contact with the work.

I claim:

1. In combination, a portable electric welding tool having a pair of electrodes, one of said electrodes being mounted for movement toward and away from the other electrode, a lever carried by said tool to move the movable electrode, power-operated actuating mechanism for said lever including a constantly operating motor remotely mounted relative to the tool, a travelling support for said motor, a flexible conduit interconnecting said support and said tool, a flexible metallic member carried by said conduit and interconnected between the motor and the lever, timing mechanism carried upon said support for controlling a welding circuit for said electrodes, and means operatively connecting the flexible metallic member and timing mechanism in a manner to cause establishment of the circuit in relation to a predetermined position of said flexible member.

2. A portable welding tool comprising the combination of a pair of substantially horizontally extending frame members, one of said members having a vertically extending leg, means to secure said leg in adjusted position relative to the other frame member, insulating means disposed between said leg and the other frame member to electrically insulate one frame member from the other, oppositely facing electrodes carried by the respective frame members, one of said electrodes being slidably mounted in its respective frame member for movement toward and away from the other electrode, and power-operating means remotely mounted from the tool to actuate said movable electrode, said power operating means including a flexible control wire and a constantly operating motor.

3. A welding mechanism of the type described, comprising a portable welding tool having a frame provided with a substantially horizontally extending arm, a second substantially horizontally extending arm mounted on the first-named arm for movement toward and away therefrom, a welding electrode carried by the first-named arm, a second welding electrode slidably mounted in the second-named arm for movement toward and away from the first-named electrode, lever mechanism carried by the second-named arm for actuating the electrode carried thereby, constantly operating power mechanism spaced from the frame, and a flexible mechanical connection between the power mechanism and the lever actuating mechanism to move the second-named electrode, whereby the tool may be moved from place to place independently of the power mechanism.

4. A portable welding mechanism of the type described comprising in combination a tool having a C-shaped frame provided with a pair of substantially horizontally extending arms, one of said arms being hollow, adjustable means to position said arms relative to each other, a welding electrode movably carried by the hollow arm, a second welding electrode carried by the other arm, linkage mounted within the hollow arm for actuating the movable electrode carried thereby, an electrically powered operating mechanism remotely mounted relative to the frame, and a flexible mechanical connection between the powered operating mechanism and the linkage to move one electrode towards and from the other.

5. In a welding apparatus, the combination of a stationary and a movable electrode, a constantly operating electric motor, means operatively connecting the motor to the movable electrode including a clutch, a cam, and a flexible rod, electro-magnetic means for controlling the operation of the clutch, yieldable means actuated by the cam and movable with respect to the rod and coacting with the rod for preventing the flow of current through the electrodes, until the electrodes engage the work with sufficient pressure to effect a weld.

6. In welding apparatus, comprising the combination of a portable welding tool, a constantly operating motor remotely mounted relative to the tool, a pair of electrodes carried by the tool, one of which is movable toward and from the other, a transformer mounted apart from the tool, flexible conducting leads connecting the secondary of the transformer with the electrode, a flexible actuator for the movable electrode, selective means for completing the drive between said motor and electrode actuator, means on the tool for controlling the actuation of the selective means, and timing mechanism carried in part by said flexible electrode actuator for closing the primary circuit of the transformer, to thereby effect a weld.

7. In welding apparatus the combination of a portable welding tool a trolley, a constantly operating motor remotely mounted relative to the tool and mounted upon the trolley, a pair of electrodes carried by the tool, one of which is movable toward and from the other, means for cooling the electrodes, a transformer mounted upon said trolley and apart from the tool, flexible electrical leads connecting the secondary of the transformer to such electrodes, a flexible mechanical actuator interconnecting the motor and movable electrode, selective means carried in part by the trolley for controlling the actuator, means carried in part by the tool for controlling the actuation of the selective means, and timing mechanism on the trolley including a solenoid for closing the primary circuit of the transformer to thereby effect a weld.

8. In combination, welding mechanism comprising a support, a portable welding tool having a pair of oppositely disposed electrodes, one of which is movable relative to the other, flexible mechanical means for actuating the movable electrode, a constantly operating motor mounted upon the support for movement independently of the tool, means for selectively connecting the motor with the flexible mechanical electrode actuator including a one-revolution clutch, electrical means for controlling the actuation of the clutch to complete or sever the driving connection between said motor and flexible electrode actuator, a transformer remotely located with respect to the tool and mounted upon the support, flexible conductors connecting the secondary of the transformer with said electrodes, an electrical circuit for the primary of said transformer, and timing mechanism on the support actuated by movement of the flexible actuator to close the primary circuit of said transformer to effect a weld by the electrodes only after a predetermined pressure of the electrodes against the work has been reached.

9. Welding mechanism of the type described, having a suspended and counter-balanced portable welding tool, a pair of electrodes carried by the tool, one of which is movable with respect to the other, in combination with means for actuating the movable electrode comprising a constantly operating motor, supporting means for the motor remote from the tool, a flexible mechanical actuator for the movable electrode, mechanism carried by the supporting means to connect the flexible actuator with the motor, said mechanism including a clutch, and means carried by the supporting means for actuating said clutch to complete the driving connection between the motor and flexible actuator, thereby to move the electrodes toward one another and against the work to be welded, and means including the flexible actuator for governing the feeding of welding current to the electrodes in accordance with a predetermined pressure of the electrodes on the work.

10. In welding mechanism of the type having a portable welding tool, a pair of electrodes carried by the tool, one of which is movable with respect to the other, in combination with means for actuating the movable electrode comprising a trolley, a motor remotely located relative to the electrodes and mounted upon the trolley, a flexible actuator for the movable electrode, mechanism to selectively connect the flexible actuator with the motor, including a two-part clutch and reduction gearing, electrical means for actuating said clutch to complete the driving connection between the motor and flexible actuator to thereby move one electrode towards the other, a transformer mounted upon said trolley and apart from the portable welding tool, flexible current-conducting leads connecting the secondary of the transformer with the electrodes, an electrical circuit connecting the primary of the transformer with an outside source of electric power, and timing mechanism on the trolley actuated by predetermined movement of the flexible electrode actuator to control the primary circuit of said transformer.

11. A welding mechanism comprising in combination, a portable welding tool carrying a pair of welding electrodes, one of which is mounted for movement relative to the other, a travelling trolley suspended above the tool and having mounted thereon, a constantly operating motor, reduction gearing, a clutch to selectively connect and disconnect the drive between the gearing and motor, a transformer having primary and secondary circuits, and a timing mechanism for closing the primary circuit of the transformer, a flexible mechanical actuator connecting the gearing with the remotely mounted movable electrode, a controller carried by the tool for controlling the operation of said clutch, and flexible conductors connecting the secondary of said transformer with said electrodes, whereby a weld may be effected whenever the timing mechanism closes the primary circuit of the transformer.

MERIL L. ECKMAN.